United States Patent [19]

Kimura

[11] Patent Number: 5,237,609

[45] Date of Patent: Aug. 17, 1993

[54] PORTABLE SECURE SEMICONDUCTOR MEMORY DEVICE

[75] Inventor: Masatoshi Kimura, Itami, Japan

[73] Assignee: Mitsubishi Denki Kabushiki Kaisha, Tokyo, Japan

[21] Appl. No.: 498,848

[22] Filed: Mar. 26, 1990

[30] Foreign Application Priority Data

Mar. 31, 1989 [JP] Japan .................................. 1-77979
Mar. 31, 1989 [JP] Japan .................................. 1-77980

[51] Int. Cl.⁵ ............................................. G11B 23/28
[52] U.S. Cl. ......................................... 380/3; 380/23; 380/25; 380/19; 235/380
[58] Field of Search .................... 380/3, 23, 25, 49; 235/380, 441, 382, 379, 492, 487

[56] References Cited

U.S. PATENT DOCUMENTS

| | | | |
|---|---|---|---|
| 4,007,355 | 2/1977 | Moreno | 235/61 |
| 4,092,524 | 5/1978 | Moreno | 235/419 |
| 4,102,493 | 6/1978 | Moreno | 235/419 |
| 4,697,072 | 9/1987 | Kawana | 235/380 |
| 4,734,569 | 3/1988 | Kawana et al. | 235/487 |
| 4,746,788 | 5/1988 | Kawana | 235/380 |
| 4,780,602 | 10/1988 | Kawana et al. | 235/380 |
| 4,794,236 | 12/1988 | Kawana et al. | 235/441 |
| 4,797,542 | 1/1989 | Hara | 235/380 |
| 4,845,351 | 7/1989 | Hara et al. | 235/492 |
| 5,010,237 | 4/1991 | Kawana | 235/379 |
| 5,120,939 | 6/1992 | Claus et al. | 235/382 |

FOREIGN PATENT DOCUMENTS

| | | |
|---|---|---|
| 0114522 | 8/1984 | European Pat. Off. . |
| 0216298 | 4/1987 | European Pat. Off. . |
| 0286094 | 10/1988 | European Pat. Off. . |
| 2503423 | 10/1982 | France . |
| 53-6491 | 3/1978 | Japan . |
| 2154344 | 9/1985 | United Kingdom . |

Primary Examiner—David Cain
Attorney, Agent, or Firm—Leydig, Voit & Mayer

[57] ABSTRACT

A portable semiconductor memory device for interfacing with and exchanging information with an external terminal, said portable device having a security function for controlling access to a main memory. The main memory is adapted to exchange data with the external terminal by means of an interface bus which includes data lines, address lines and control lines. Access controls means in the portable unit is utilized to control access to the main memory. The unit also has a security memory comprising two sections. One section stores enciphered data which is read out to the external terminal, deciphered and returned to the unit as the first element used in a comparison. The second section of the security memory stores internal identification information. The two elements of identification information are provided to a comparator means which enables access to the main memory via the interface bus after a match is detected.

33 Claims, 6 Drawing Sheets

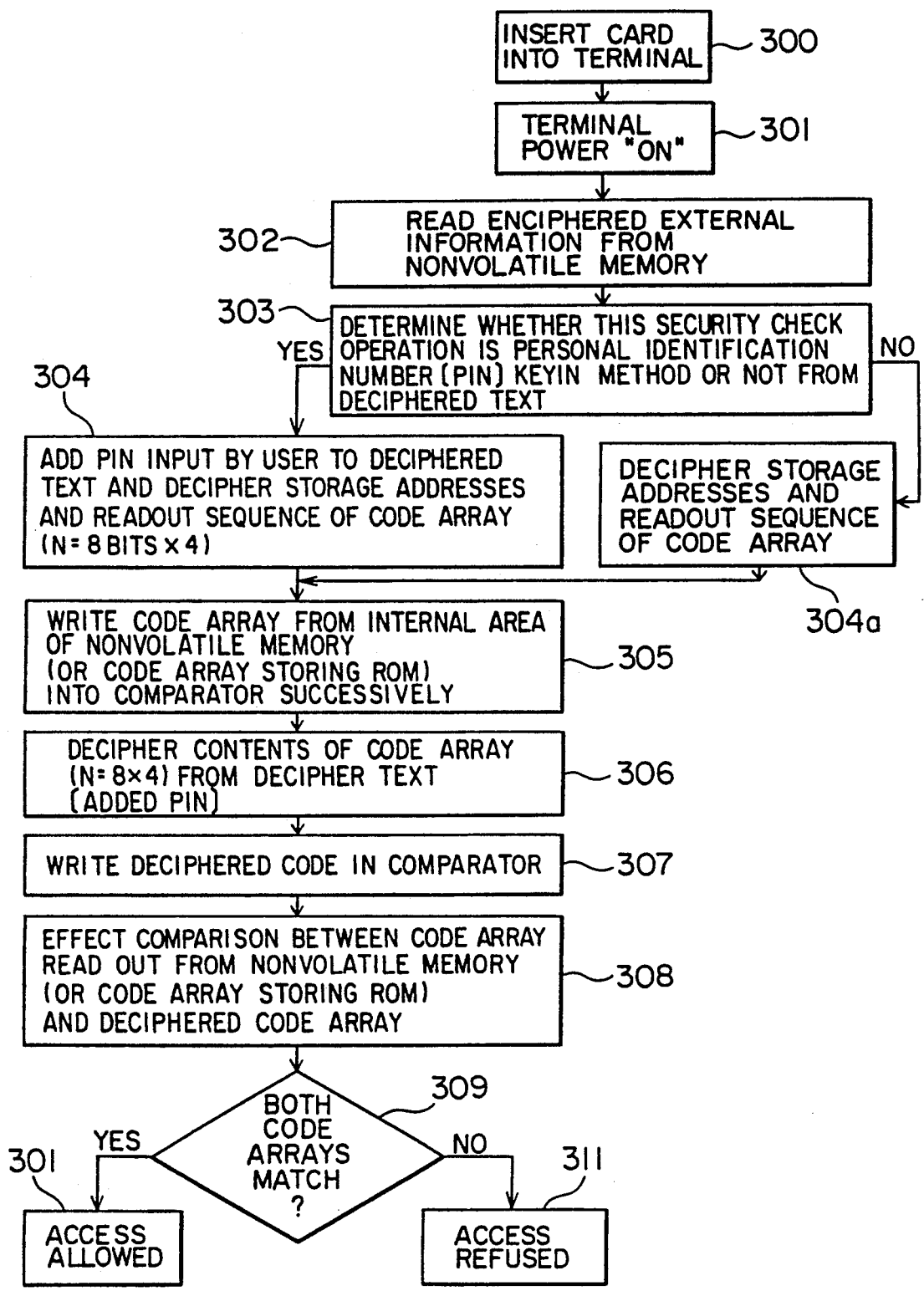

PORTABLE SECURE SEMICONDUCTOR MEMORY DEVICE

FIELD OF THE INVENTION

This invention relates to portable semiconductor memory devices, and more particularly to such devices which include a security function intended to protect the information stored in the portable memory.

BACKGROUND OF THE INVENTION

Memory devices such as memory cards can be thought of as divided into two classes—"smart cards" which have a microprocessor in addition to a main storage unit, and "memory cards" which have only memory but no programmable (or programmed) microprocessor.

Because of the processing capability available in smart cars as a result of the on-board microprocessor, there are numerous security techniques useful with such cards for protecting the integrity of the data stored on the card. Thus the on-board microprocessor can perform various functions in checking PIN numbers, hand shaking with a processor in an external terminal, performing, enciphering and deciphering operations on-board the smart card, and other techniques all prior to allowing access to the main memory on the card. Thus, significant capacity is available for insuring the integrity of the data in a smart card.

However, in memory cards which do not have the power of an on-board microprocessor, the capacity for performing security checks before allowing access to the main memory is substantially more limited. In a memory card typically the data, address and control lines of the main memory modules are coupled directly to the card outputs and are thus available for read out either in a terminal for which the card is intended or otherwise. Thus, the opportunity is available for someone intending to breach the security of the internal memory to directly access the memory device if reasonable care is taken in interfacing the data, address and control lines of the memory elements which are all readily available at the card connection points. Even when the card is used in a terminal for which it is intended, security functions are usually desirable, such as insertion of a PIN number by a user, or some means of insuring, based on a check of card stored information and terminal supplied processing power that the two are of intended compatability before memory access is allowed.

With only hard wired logic elements at most available on a memory card for performing the security function, insofar as applicant is aware, the techniques which have been made available for securing the stored information are not as reliable as could be desired.

The security issue will be further developed with reference to FIG. 7 which shows a configuration of a conventional memory card having on-board semiconductor memory which is substantially non-secure. The portable semiconductor memory card 1 of FIG. 7 carries an on-board semiconductor memory 4, usually comprised of an array of semiconductor memory devices 4a-4n. The address lines of the semiconductor memory devices $4a \propto 4n$ are coupled together to form an address bus 14, and the data lines coupled together to form a data bus 15. The address bus 14 and data bus 15 are elements of an interface bus 40 comprising address lines 14, data lines 15, and control lines including a card select signal line 16, a write enable signal line 17 and an output enable signal line 18. The address, data, and control lines provide access to the semiconductor memories $4a \propto 4n$ in conventional fashion. The card select signal on line 16 is utilized to enable the semiconductor memory elements in a manner which will be described below.

One further connection is provided from the terminal into which the memory card is inserted, and that is a supply of power which is coupled to power supply line 11. A power supply sensing and changeover circuit generally indicated at 2 senses the application of power to the line 11, and couples that applied power to the remaining circuitry for operation. It is noted that to maintain the information in the semiconductor memory 4 during the substantial intervals when the card is not inserted in the terminal, a stand-by battery 6 is used to supply power to internal power bus 9 via current limiting resistor 7 and a reverse poled charge prevention diode 8. However, whenever the card 1 is plugged into a terminal and a source of power is connected to external power bus 11, a sensing module 3 within the power supply changeover circuit 2 senses the voltage level on the bus 11 and in response thereto switches on a pass transistor 12 and thereby couples the external power source to the internal power bus 9. In addition, the sensing module 3 within the power supply changeover circuit 2 applies a high logic signal on output line 13 which in turn is coupled to a G input of a memory select circuit 5, providing a preliminary enabling signal to the circuit 5. Thus, whenever the power applied to the external bus 11 is higher than that supplied by the battery 6, that condition is sensed by the power supply changeover circuit 2 and the sensing module 3 thereof performs two functions, namely (a) switches on the pass transistor 12 in order to supply external power to the internal bus 9 and (b) couples a high logic enabling signal to the control line 13 providing the preliminary enabling signal to the memory selection circuit 5.

It is seen that the memory selection signal 5 has a series of outputs $S_1$-$S_n$ which are coupled respectively as enabling inputs 19a-19n to associated semiconductor memory devices 4a-4n. A selected one of those output lines is individually driven low depending upon the address signal coupled to the address inputs $A_n$ of the selector module 5. Thus, the higher order address bits from the address bus 15, which are coupled to the individual lines of address input $A_n$ are used to select which of the semiconductor memory devices $4a \propto 4n$ will be active at any given time. It is noted that the address inputs and $\overline{G}$ input of selector 5 are provided with pullup resistors 10 to assure that all memory devices $4a \propto 4n$ are disabled except when the inputs are intentionally driven low.

A final input to the memory select circuit 5 is the $\overline{G}$ which is coupled to the card select signal line 16 which is an element of the control lines of the interface bus 40. Thus, whenever the particular memory card 1 is selected, the external terminal couples a low logic signal to the line 16, and thus provides an enabling signal to the $\overline{G}$ input of selector 5.

In summary, when power is applied to the external bus 11, the G input of select circuit 5 is driven high. Subsequently, when the card select input 16 is driven low, the $\overline{G}$ input of select circuit 5 is driven low, thus enabling the outputs of select circuit 5 to respond to the logic levels on the address inputs. Thus, the external terminal couples address signals to the high order bits on the address bus 15 which serve to individually select the outputs $S_1$-$S_n$ of the selector 5 and in turn individually enable the semiconductor memory devices 4a-4n. When enabled, a semiconductor memory device responds to address signals on the address bus 15, to write or read signals and enable signals on the control lines 17, 18 to either write information into the addressed semiconductor memory location from the data bus 15 or read the information stored in the addressed location out onto the data bus 15, both for interfacing with the external terminal.

With that understanding of a conventional memory card 1, it will be appreciated that the semiconductor memory 4 is in a relatively non-secure state. The data lines of the semiconductor memory, the address lines of the semiconductor memory and the control lines (read/write and enable) of the semiconductor memory are all available at the card output. Typically, such control signals will be directly available at the card contacts which are intended to interface with an external terminal. Even in the case where the card receives a serial message which is stored in a register or the like for coupling to a semiconductor memory, there is little security associated with the serial receiver or serial to parallel converter, and thus the terminals of the memory devices themselves can be considered as being available to the outside world. While smart cards having on-board microprocessors can provide the desired security, it has been found impractical to provide an effective amount of security for the on-board memory using only hard wired logic elements.

It will also be apparent that one can utilize such a semiconductor memory device in a terminal designed to accept it whether or not the individual possessing the card is indeed authorized to use it. There is no security check provided, it is simply necessary to couple the appropriate voltage levels or signals to the card, and the individual memory devices are directly addressed for writing or reading as desired.

Even without a compatible terminal, it is relatively easy to access the contents of the memory 4. It is simply necessary to couple power to the external power bus 11, appropriate control signals, address signals and data signals to the interface bus 40, and the internal memory is directly accessible. Thus, an unauthorized individual, even without access to a compatible terminal, can access the memory and read out information which had been intended to be secure. As a further example, an unauthorized individual can write information into the semiconductor memory, and a subsequent user will be unaware that the security of the stored information has been breached. If security is at all a factor in using a portable memory device, the limitations of the device illustrated in FIG. 7 will now be apparent.

SUMMARY OF THE INVENTION

In view of the foregoing, it is a general aim of the present invention to provide a portable memory device of inexpensive construction, and requiring no on-board microprocessor unit, but exhibiting a comparatively high degree of security provided in large measure by logic elements resident on board the card.

In that regard, it is an object of the present invention to provide a portable memory device in which the on-board memory is accessible to the outside only after completion of a security check which matches information stored in a separate section of memory on the card, in which the security information available to the outside is in enciphered form.

Stated differently, an object of the present invention is to provide a portable memory device in which external access is allowed to the on-board semiconductor memory only after a security check, which includes matching an identification code maintained internal to the card with a code deciphered by an external terminal from enciphered information received from the card.

According to a more detailed aspect of the invention, it is an object to provide a security memory on a portable memory card in which the security memory is partitioned in such a way that only enciphered security information is available to an interface bus while additional security information which need not be enciphered is maintained in a partition of memory which is accessible only within the card.

According to one aspect of the invention, an object is to provide a secure portable semiconductor memory device in which security is provided by utilization of security codes stored in a partitioned on-board security memory, one partition of the memory containing enciphered security information which is accessible to an interface bus, and the other partition containing security information which need not be enciphered but is available only within the card and is isolated from the interface bus.

In accordance with the invention there is provided a portable semiconductor memory unit for interfacing with and exchanging information with an external terminal. The unit includes a main memory and an interface bus for coupling the main memory to the external terminal. Enabling means selectively allows access to the main memory via the interface bus. The enabling means includes a security memory having a first section for storing enciphered external data and a second section for storing internal data which is isolated from the interface bus. The enabling means further includes a comparator having a first input for receiving deciphered external data from the external terminal which results from deciphering of the enciphered external data received from the card via the interface bus. The comparator has a second input for receiving internal data from the second section of the security memory. Finally, the comparator has an output which causes the enabling means to allow access between the external terminal and the main memory upon detection of a match between the internal and external data.

It is a feature of the invention that any security information which is not in enciphered form is isolated from the interface bus so that the only security information available outside the card is enciphered. A further feature of the invention is partitioning of the security memory in such a way as to prevent read out of the section containing the non-enciphered information to the interface bus.

A further feature of the invention is the storage on the card of two independent identification codes, an internal identification code which need not be enciphered but which is isolated from the interface bus so that it is not ascertainable from outside, and an external identification code which is intended to be accessed by an external terminal, but which is enciphered and thus cannot readily reveal the internal identification code. In a preferred embodiment of the invention, it is a further feature that the enciphered external information includes address identification information used to address locations in the security memory at which the internal identification code is stored, so that the value and sequence of the identification codes provide a further measure of security for the portable semiconductor memory.

As a further feature of the invention, a PIN identification number input by a user into an external terminal can be combined with the external security information in order to provide further security and further limit access to only those who are in possession of the PIN number.

Other objects and advantages will become apparent upon references to the following detailed description when taken in conjunction with the drawings in which:

BRIEF DESCRIPTION OF THE DRAWINGS

FIG. 6 is a flowchart illustrating the operation of the secure memory system according to the present invention.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
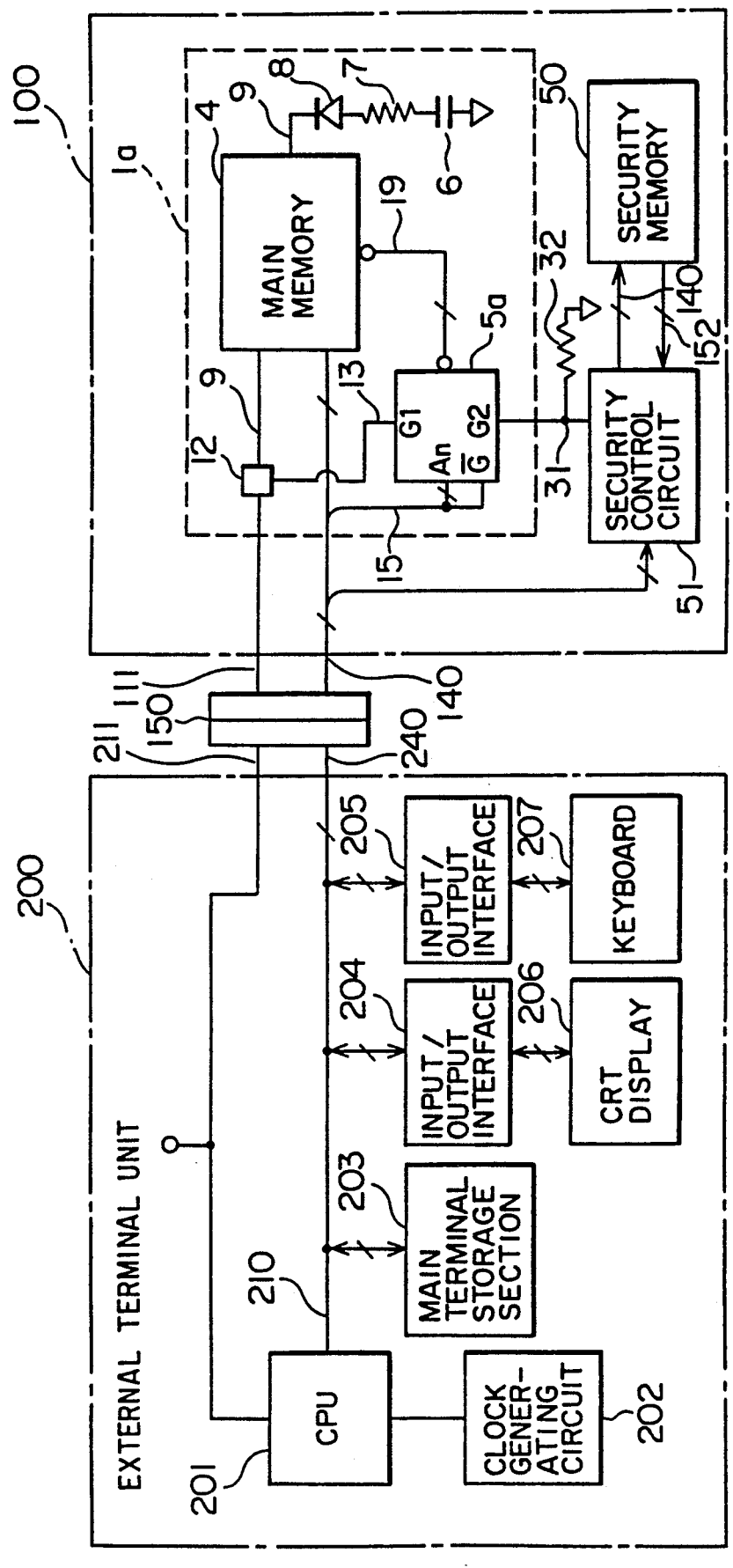
FIG. 1 is a block diagram showing a secure memory system including an external terminal unit coupled via an interface bus to a portable memory device.

Turning now to the drawings, FIG. 1 shows a portable memory card 100 exemplifying the present invention and interfaced to an external terminal 200. The electrical connection between the devices is schematically illustrated by connector 150. In practice, the external terminal will preferably include a slot or other close fitting receptacle into which the memory device 100 is inserted and which will cause mating of electrical contacts between the portable card 100 and the external terminal 200, such mating being illustrated by the aforementioned connector 150. As illustrated in FIG. 1, the connections include those made to an interface bus 140 as well as a power bus 111. It is seen that the external terminal includes a similar power bus 211 and interface bus 240 coupled to the connector 150, such that the terminal unit 200 supplies DC power to the portable card 100. In addition, the coupling of busses 140, 240 causes the connection of data lines, address lines and control lines between the portable memory card 100 and the external terminal 200.

The external terminal will be not described in great detail as its structure can be relatively conventional. It is shown to include a central processing unit 201 coupled by means of an internal bus 210 to a main terminal storage section 203, a display input/output 204 and a keyboard input/output 205. The main terminal storage section 203 includes a main semiconductor memory which is used for storing a program of instructions for operating the processing unit 201, for storing information which is to be coupled to the portable memory unit 100 and for storing information received from the portable memory unit 100. The storage section 203 in effect serves as the main memory for the external terminal 200. It can be configured as a single unit or in individual blocks, as desired. The main terminal 200 also includes a clock generating circuit 202 which provides clock signals for the CPU 201 and additionally controls the timing of signals which are coupled to the portable memory unit 100 when such unit is connected.

The input/output interface 204 is coupled to and therefore drives a CRT display unit 206 for displaying information to a user of the external terminal. Similarly, the input/output interface 205 is coupled to a keyboard 207 to receive information keyed into the keyboard by such a user. Thus, the terminal unit 200 can be considered relatively conventional as including the major elements familiar to those working in this art. However, the main terminal storage section 203, as will be described below, also includes a program module capable of receiving enciphered external information from the security memory of the portable semiconductor device 100, deciphering such information and causing the CPU 201 to drive its address, data and control lines in such a way as to cause a security check to be completed in the portable semiconductor unit 100. Such program module principally deciphers the enciphered external information, writes the deciphered identification information into a comparator in the portable semiconductor memory, and uses address identification information derived from the deciphered information to address a security memory in the portable semiconductor memory unit for reading out into the comparator the internal identification code for comparison with the deciphered external identification code.

Directing attention then to the structure of the portable semiconductor device 100, it is seen, like the prior art semiconductor device, to include a main memory 4 having an internal power bus 9 supplied with stand-by power from a battery 6 via current limiting resistor 7 and charge protection diode 8. The internal power bus 9 is connected via power supply changeover circuit 2 to an external power bus 111. As with the prior portable memory device, when the power bus 111 is supplied with power at a voltage higher than that of the internal battery 6, the changeover circuit 2 senses that condition, couples the external power source to the internal bus 9 and couples a high enabling signal to enabling line 13 which is coupled in turn to input G1 of the memory selection circuit 5a.

The main memory 4 is shown to have an interface bus 140, which is illustrated as a single bus in FIG. 1, but which includes data lines, address lines and control lines as will be described in greater detail below. Those lines are coupled directly to the main memory 4, but in practicing the invention are not allowed to directly access the main memory until after successful completion of a security check routine which is controlled by information in the portable device 100, at least some of which is inaccessible to the interface bus and therefore practically inaccessible outside the card.

In practicing the security aspects of the invention, a security memory 50, preferably a non-volatile memory, is provided for storing security related information. A security control circuit 51 is coupled to the interface bus 140 and performs the function of controlling access to the security memory 50, receiving security related information which originated from the security memory 50, and performing a security comparison of internal and external security information before allowing access between the interface bus 140 and the main memory 4. In FIG. 1, the interface bus 140 is shown interconnecting the security control circuit 51 and security memory 50, illustrating that the external terminal has the ability for limited access to the security memory in performance of the security check. Also shown connecting those modules is an internal bus 152 which is provided only between the security memory 50 and security control circuit 51. Such bus, as will be described in greater detail below, provides a means for readout of security information which is not necessarily enciphered for coupling to the security control circuit in performance of the security check. The fact that the bus 152 is internal only and not coupled to the main interface bus 140 provides a significant degree of security when it is appreciated that the only information which is available to the interface bus is in enciphered format, and only external terminals of approved form have the ability to utilize the encipher key to decipher the enciphered security information.

Figure 7:
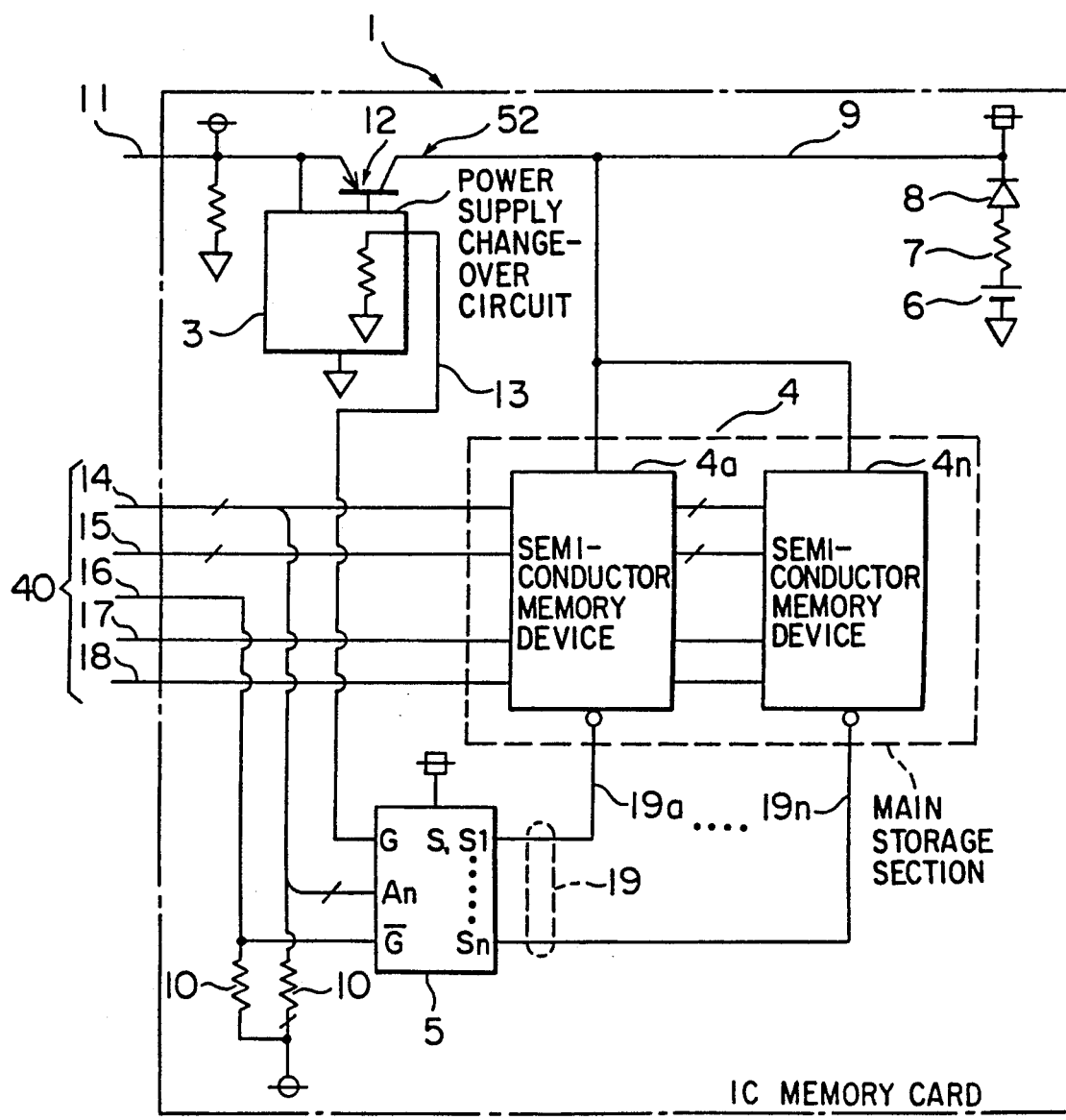
FIG. 7 is a block diagram illustrating a memory card exemplifying the prior art.

The memory selection circuit 5a is provided, in addition to enabling inputs G1 and $\overline{G}$, with a second enabling input, labeled G2, and that input is driven by the security control circuit 51. A pulldown resistor 52 maintains the input G2 in the low condition at all times except after the card is inserted into the compatible external terminal and a security check procedure successfully performed. After successful performance of such procedure, the security control circuit 51 provides a high logic signal on output line 31, such logic signal being coupled to enabling input G2 of the main memory of the memory selector circuit. Thus, with a high logic level signal applied to terminal G1 of the circuit (as a result of the card having positive voltage applied to the internal bus 9 as sensed by power supply changeover circuit 2), as a result of a low $\overline{G}$ signal applied by the card select input 16, and as a result of the high logic signal being applied to input G2 in response to successful performance of a security check, the memory selector circuit 5a is enabled to respond to address signals on address bus 14 to individually enable the semiconductor memory devices which make up the main memory 4. In FIG. 1, the main memory 4 is illustrated as a single block, but it is pointed out that such block is typically made up of individual memory chips $4a \propto 4n$ as illustrated in connection with FIG. 7, and that such chips are individually enabled by individual enablement signals 19a–19n, such enabling signals being illustrated in FIG. 1 by the multi-conductor bus 19.

Figure 2:
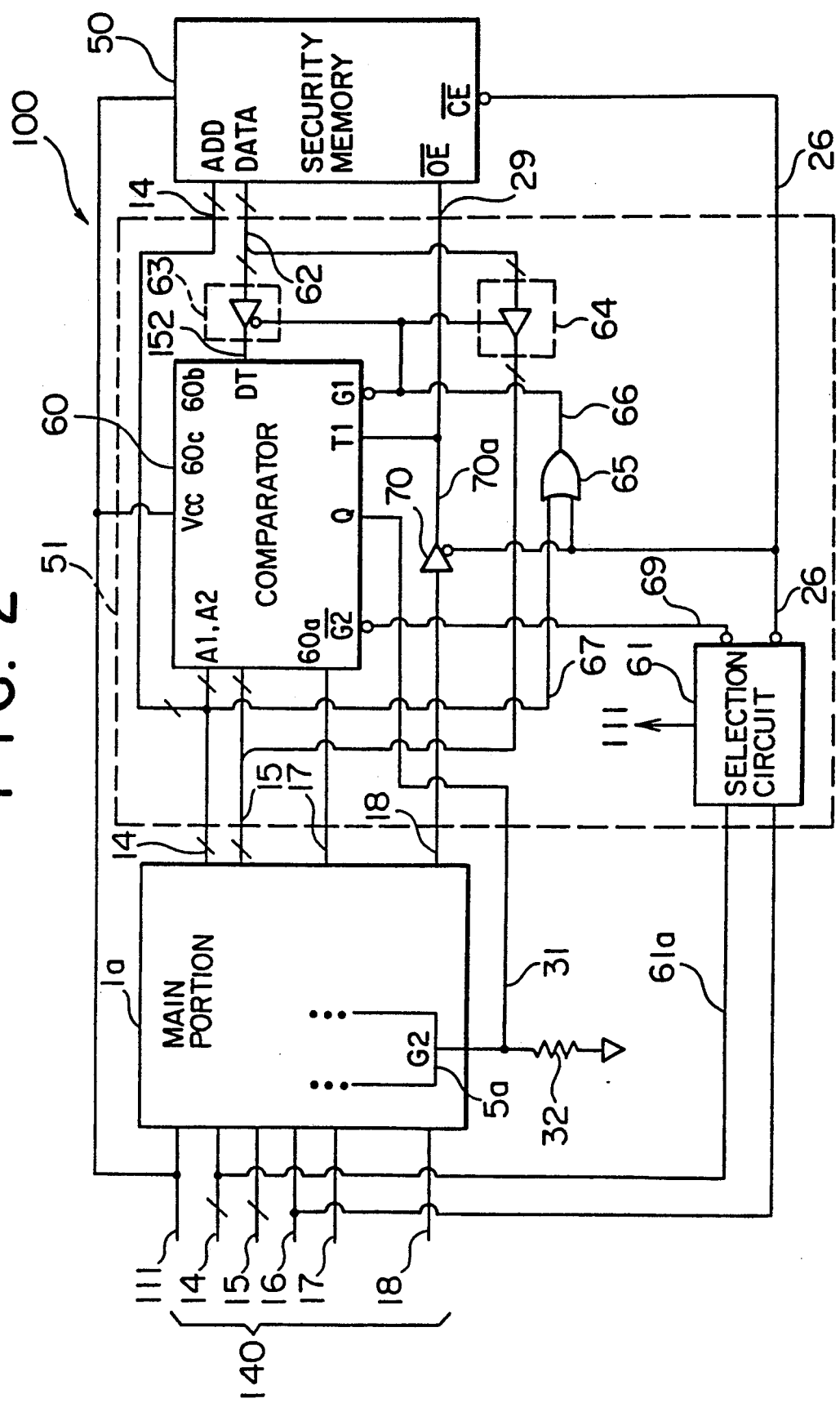
FIG. 2 is a block diagram illustrating additional details of the security aspects of the portable memory device of FIG. 1.

Turning then to FIG. 2, there are illustrated further details of the security control circuit 51 of the system of FIG. 1. The main memory 4, associated power components, and memory selection circuit 5a are enclosed in FIG. 1 in a box labeled 1a, and that box is illustrated in FIG. 2 with the internal detail omitted. The only element shown within the block 1a in FIG. 2 is the G2 input of memory selector circuit 5a, i.e., the input which is driven by the security control circuit in order to enable access between the interface bus and the main memory after successful performance of a security check.

The information which is primarily involved in the security check is stored in the security memory 50, illustrated at the right of FIG. 2. As noted above, the security memory 50 is a non-volatile memory which contains two forms of security information, namely, external identification information intended to be read out to the external terminal and which is maintained in enciphered form, and internal identification information which need not be enciphered and is available only within the portable unit 100. For purposes of economy, the non-volatile security memory 50 is preferably a read only memory, such as an EPROM or EEPROM. In the FIG. 2 embodiment, the security memory 50 is a single memory device which is memory mapped into upper and lower addressable sections for storing the respective internal and external security information.

FIG. 2 shows the security control circuit 51 as including a comparator element 60 which serves to compare internal and external security information, and a selection circuit 61 which is operable to allow an external terminal to control the security memory 50 and comparator 60 in performing a security check procedure. A number of gates and the like, to be described in greater detail below, interconnect such elements, and it will now be appreciated that this security control circuit is comprised of hard wired logic elements and does not require the power or programming of a microprocessor in order to provide a substantial degree of security protection to the main memory 50.

The comparator 60 can be considered as divided into two sections, an internal information section 60b for receiving and holding internal identification information directly from the security memory 50, and an external information section 60b for receiving and holding information which had originated from the security memory 50 but which had been transferred to the external terminal, deciphered then returned to the portable unit 100. When the information stored in the two halves of the comparator circuit matches, an intermediate comparator section 60c produces a high logic signal on the Q output and, as discussed in reasonable detail above, such logic signal is coupled by means of line 31 to the G2 enabling input of the security control circuit 51 in order to allow access by way of the interface bus 140 between the external terminal and the main memory 4 of the portable unit 100.

The manner in which those functions are performed will now be described in greater detail. First of all, it is seen that the security memory, as is conventional, has address inputs for addressing individual locations within the memory, and data lines which will carry logic levels corresponding to the information stored in the addressed location in memory. The security memory 50 also has a chip enable input $\overline{CE}$ driven low by a line 26 whenever information is to be read out of the security memory, and also an output enable input $\overline{OE}$ which also must be driven low in order to address and read out information from the security memory.

The address lines of the security memory 50 are connected to the address lines 14 of the interface bus 140 so that the external terminal has the capability of addressing individual locations within the security memory 50. The data lines 62 of the security memory are not directly coupled to the interface bus in order to maintain security of the internal identification information. Instead, the data lines 62 of the security memory are coupled via a pair of tri-state buffers 63, 64 to two separate bus structures. The tri-state buffers are enabled alternately, such that when any set is active, the other set is maintained inactive. The first set of tri-state buffers 63 couples the data lines 62 of the security memory 50 to the internal data bus 152 such that data words addressed in the security memory can be read into the internal latch 60b of the comparator circuit 60 at an input data terminal DT. The second set of tri-state buffers 64 is coupled between the data lines 62 of the security memory and the data lines 15 of the interface bus 140, such that when the buffers 64 are enabled, data read out of the security memory 50 is placed directly on the data lines of the interface bus.

Figure 4:
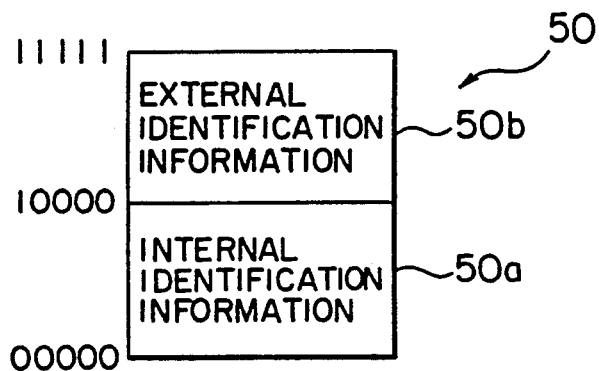
FIG. 4 is a diagram illustrating memory partitioning for the security memory of the system of FIG. 1.

It was noted above that in the FIG. 2 embodiment the security memory 50 was preferably a single memory device partitioned by way of memory mapping into separate areas for storing of internal and external security information. Such partitioning is illustrated in FIG. 4 which shows the security memory 50 as being divided into two halves mapped by the upper order address bit into a lower section 50a for storing internal identification information and an upper section 50b for storing external identification information. Thus, for all addresses between 00000 and 01111, only the areas of memory 50 are addressed which contain internal identification information, and the bus structure is arranged to assure that the data lines of the memory 50 are isolated from the interface bus when such memory locations are addressed. Similarly, when any address within the security memory between 10000 and 11111 is addressed, only external identification information is being accessed, and the bus structure is arranged to allow such information to be read onto the interface bus. It is noted that other forms of memory positioning or mapping can be used when desired.

As noted above, the tri-state data buffers 63, 64 are elements of such bus switching structure. It is seen that the enabling input of such buffers is driven by an OR gate 65 having a pair of inputs, one input 67 of which is taken from the address bus 15 and represents the upper order address bit. Assuming for the moment that the second input to the gate 65 is maintained in the low state whenever the security memory is being addressed, it will be seen that the logic state of the upper order address bit will control the logic level of the output 66 of OR gate 65. Thus, when the upper order address bit is a 1 indicating that the upper section of the memory 50 is being addressed (the external identification information), it will be seen that the output 66 is at a high level, enabling the array of gates 64 and disabling the array of gates 63. Thus, data from addressed locations in memory 50 which appears on the data lines 62 will be coupled through the buffers 64 to the data lines 15 of the interface bus 140. Similarly, when the upper order address line is at a low logic level, indicating that the lower section of security memory 50 is being addressed (only the internal identification information), it will be seen that the output 66 of OR gate 65 is at a low level, disabling the buffers 64, but enabling the buffers 63. That condition of the buffers allows data from the address locations in memory 50 to be read to the input terminal of the latch section of comparator circuit 51, while completely isolating that data from the interface bus by means of the disabled gates 64. The ability of the embodiment of FIG. 2 to thus allow the readout of enciphered security information while protecting the integrity of internal information which need not be enciphered will now be apparent.

Turning for a moment to the second input of OR gate 65, it is seen that it is driven by the aforementioned selection circuit 61. That circuit has a pair of inputs, one of which is driven from selected ones of address lines from the address bus 14, and the other of which is driven from the card select line 16 of the interface bus 140. Thus, whenever the external terminal desires to enable the particular portable semiconductor memory, it couples a signal to the card select line 16 of the interface bus 140 and an appropriate address to address lines 14 of the interface bus 140, which are sensed by selection circuit 61 to drive one or the other of its enabling outputs low. When the external terminal desires to read information from the security memory, address signals are coupled to the address input 61a (along with an enabling signal from card select line 16) which drives the output 68 low, which applies a low logic level to the chip enable input of the security memory, allowing information to be read out from that device. Thus, the addresses provided on the address bus 14 must enable the selection circuit 61 at the same time that the upper order bit is either a 1 or 0 for the purpose of reading out either the upper or lower sections of security memory 50. When the external terminal desires to write data from the external terminal into the comparator circuit (having decoded such information after having received it from the security memory), an address is coupled to lower order bits on the address lines 14 which causes the input 69 of the selection circuit 61 to be driven low. This in turn enables the external half of the comparator circuit 60 to receive information on the DT input which is seen to be coupled to the data lines 15 of the interface bus 140. It is also seen that the address lines 14 of the interface bus 140 are connected directly to the address inputs of the security memory 50 so that the lower order bits can be used to address particular words in the security memory.

The output enable signal 18 is coupled to a tri-state buffer 70 and used as an enable signal for reading information out of the security memory 50. It is seen that the tri-state buffer 70 is enabled whenever the selection circuit 61 is producing a low output signal on line 68 which is a chip enable signal for the security memory 50. Thus, the external terminal can then utilize a low signal applied to output enable line 18 to drive line 29 coupled to the output enable input $\overline{OE}$ of the security memory 50 low, thereby allowing readout of a word, then, upon the rising edge of the signal applied to line 18 (which is connected to input T1 of the comparator circuit 60) to cause the clocking of that data into the internal information latch 60b of the comparator circuit 60. Thus, the output enable signal coupled to line 18 of the interface bus 140 by the external terminal serves the dual purpose of (a) enabling the security memory, whenever it is low and the security memory is selected (by means of the selection circuit 61), and (b) toggling the input of latch portion 60b of comparator 60 for the purpose of latching data words into the comparator which are read out of the security memory. It is seen that input T2 which controls the external latch 60a of the comparator circuit 60 is driven directly from write enable line 17 of the external terminal, and thus when the external terminal desires to write information into the external latch of the comparator, it first places the information on the data lines (along with appropriate address information) then produces a leading edge on write enable line 17 which causes the latching of information into that latch portion.

Summarizing from a structural point of view, it is seen that the external terminal has a degree of control over the security portions of the circuitry of FIG. 2. By coupling appropriate signals on address lines, as well as a card enable signal on line 16, the external terminal can control the outputs of selection circuit 61 to allow writing of information into a latch into the external latch of the comparator circuit 60, or in the opposite condition to couple a chip enable signal to the security memory 50 to allow readout of information from that memory. Which words are read out is dependent first of all on the lower order address bits coupled to the address lines 14 which are seen to be coupled directly to the address inputs of the security memory 50. In addition, because of the memory partitioning, the upper bit also acts through gate 65 to reconfigure the bus structure connected to the data lines of the security memory 50 such that when the section of the memory is addressed which contains only secure information, that information is coupled only to the internal bus 152, whereas when the section of memory is addressed which contains enciphered information intended for readout to the external terminal, the data lines 62 are connected to the data lines 14 of the interface bus 140.

Before turning to a description of the manner in which the external terminal cooperates with the elements of FIG. 2 to perform a security check, a brief description of the elements which comprise an exemplary comparator circuit 60 will first be given. Such description will be given in connection with FIG. 3 which shows an exemplary comparator circuit.

Figure 3:
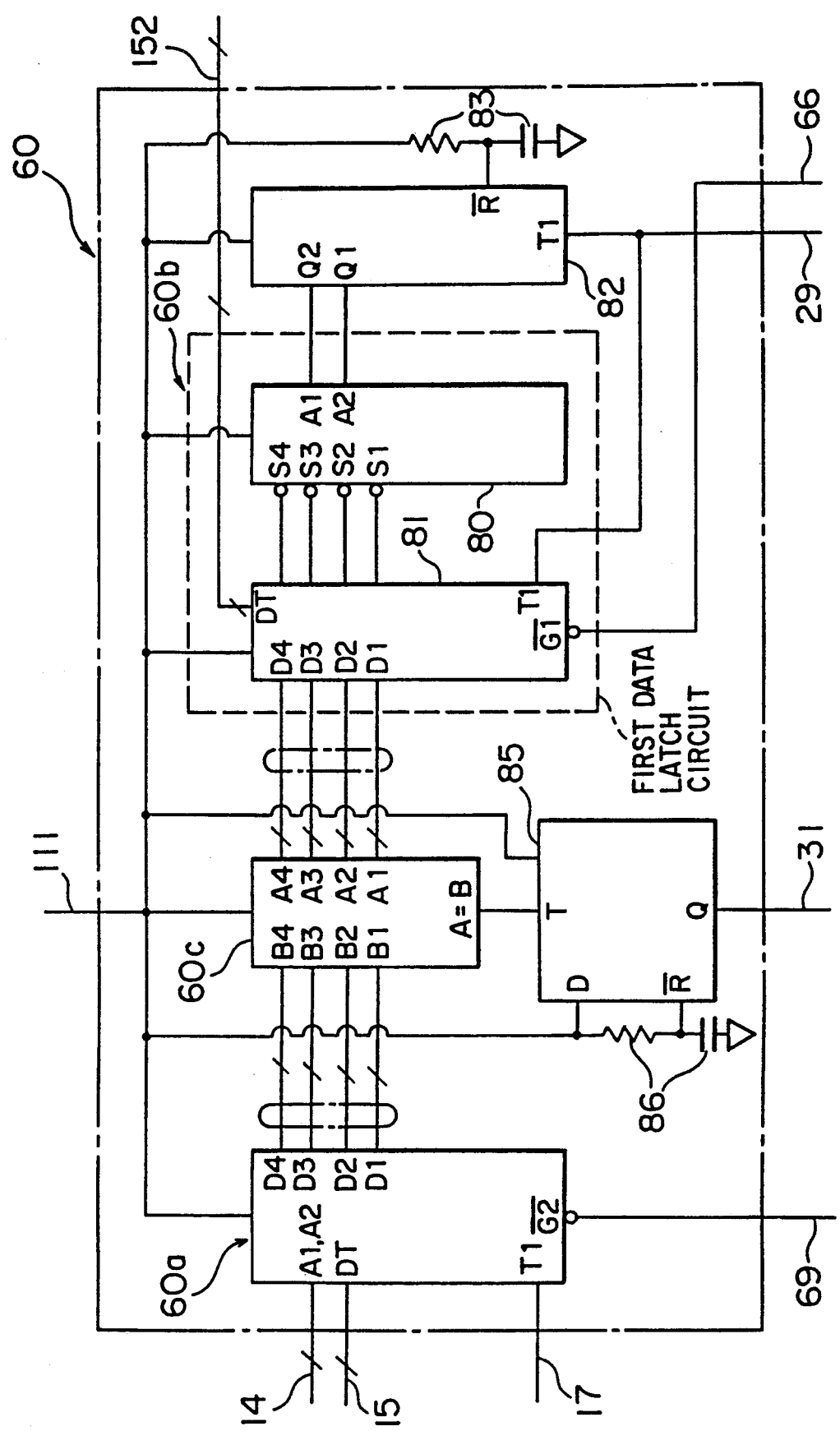
FIG. 3 is a block diagram illustrating additional details of a comparator circuit useful in connection with the embodiments of the present invention.

As in the showing of FIG. 2, the comparator circuit of FIG. 3 includes a data latch circuit for external information 60a, a second data latch circuit 60b for receiving and storing internal security information, and a central comparator portion 60c for comparing the information stored in the latches 60a, 60b. FIG. 3 shows only the data latch circuit 60b in detail; it will be appreciated that the data latch 60a is preferably of identical configuration.

Thus, the data latch circuit 60b includes a first decoder or selector portion 80 having a pair of address inputs and four outputs, driven individually low in response to the bit pattern on the address inputs. It will be noted that the two input, four output selector is used in connection with an exemplary embodiment where four data words are used in the security check procedure. In an exemplary system, a security check is performed which utilizes four words of 8 bits each, requiring a match of 32 bits in order to perform a security check before initiating operation. Thus, the latch circuit of FIG. 3 will be configured as capable of storing and comparing four data words, each of 8 bits, requiring selectors capable of distinguishing between the four words, latches capable of holding four words of 8 bits each, and comparators capable of comparing a pair of 32 bit data structures.

Returning to the structure of FIG. 3, it is seen that the selector outputs are coupled as inputs to a latch circuit 81 having a data input which is coupled to bus 152 which, it is recalled, is connected to the data lines of the security memory 50. As noted in connection with FIG. 2, the data latch circuit is both gated and triggered, and FIG. 3 shows the latch 81 as having a chip enable input $\overline{G1}$ (connected to line 66 described in connection with FIG. 2) and a trigger input T1 for responding to rising edges on line 29 described in connection with FIG. 2. Thus, whenever the line 66 is driven low, and data is presented on the data latch input 152 of the selector circuit, and one of the selector input S1-S4 is maintained at a low level, when a rising edge of the trigger signal is applied to line 29, the word on the data input bus will be latched into the appropriate locations D1-D4 (as determined by the address) of the latch. The latch circuit 60a for holding external information is similarly coupled except that the data lines for the latch circuit are driven not from the output of the security memory, but from the data lines 15 of the interface bus, the trigger signal is coupled to the write enable signal of the interface bus, and the gating signal $\overline{G2}$ is driven from line 69 of FIG. 2.

The manner in which the two latches are addressed is also somewhat different. In the FIG. 3 embodiment, the internal information data latch 60b is addressed by means of a binary counter 82 having a clock input driven by the trigger signal from line 29 (FIG. 2), and serves to simply count latch clock pulses to successively address the four words in the latch. Thus, a reset circuit comprising resistor capacitor combination 83 serves to reset the counter 82 whenever the card is inserted in a terminal and external power is first applied. Thereupon each time the output enable line 18 of the interface bus 140 is toggled to access a word of the internal identification memory for readout to the latch 60b, the counter 82 is toggled to successively address (by means of decoder 80) the successive word positions in latch 81. As a result, four successive readouts from the security memory 50 which serve to read out the four words of the internal identification information will cause the incrementing of counter 82, such incrementing being decoded in decoder 80 to successively address the four word positions in latch circuit 81 to cause the information read out to be latched into appropriate locations in the latch 81.

Addressing of the external information latch circuit 60a is by means of a pair of the address lines within address bus 14 of the interface bus 140, such lines being indicated as A1, A2 in the drawing. The data to be latched into the external information latch 60a is also applied from the external terminal 15 and is decoded in a manner which will be described in greater detail below. The latch clocking signal applied to the T1 input of external information latch 60a is provided by the write enable line 17 of the interface bus 140 as has been described. Similarly, the enabling signal $\overline{G2}$ is provided by the selection circuit 61 (see FIG. 2) when the address lines have selected the security circuit in the mode of accepting security information from the external terminal. In that mode, in a fashion similar to storage of information in the latch 81, the external information latch 60a is toggled, address lines 14 are manipulated to address a particular one of the four words, and external identification information is applied to data lines for latching into the words D1-D4 of the external information latch 60a.

In practicing the invention, the information latched into the respective internal and external latches 60b, 60a is compared in comparator section 60c on a bit-by-bit basis. When a match is detected, a high logic signal is provided on the output (designated A+B), and that signal is applied as a trigger input to a security comparison latch circuit 85. It is seen that the latch circuit has a reset input driven by a resistor/capacitor combination 86 which serves to reset the latch 85 whenever the card is inserted into an external terminal and external power applied to the power bus 111. After the capacitor within the combination 86 charges, the reset signal is removed. However, the latch circuit 85, whenever it is first inserted into a terminal, always starts with the Q output low due to the power-on reset function just described. The D input of the latch is maintained in the high condition, however, such that whenever the latch is triggered, the Q output will switch high. The latch 85 is preferably of the positive edge trigger type such that a positive edge occasioned by a match detected in comparator 60c will cause triggering of the latch 85 to drive the Q output thereof high. Since the Q output is connected to the line 31, it will be appreciated that the enabling signal provided on that line is sensed in the main portion 1a (see FIGS. 1 and 2) of the portable memory deviced to enable access to the main memory 4 by way of the interface bus 140. That condition will remain effective for so long as power continues to be applied to the card. However, after the card is removed from the terminal, the capacitor 86 will discharge, requiring a new power-on reset operation whenever the card is again inserted in a terminal, switching the Q output of latch 85 low until a valid security check is again performed.

With that understanding of the structure of one embodiment of a security system according to the invention, attention will now be directed to the manner in which the structure cooperates in performing a security check function. First of all, it is recalled that the security information necessary for performing a security check is stored in the security memory 50. The external terminal 200 (FIG. 1) has within its storage section 220 a program for deciphering the security information provided to it, but has neither the enciphered information nor the key, which are both stored in the security memory.

When a card 100 is inserted into an appropriate terminal 200, the interface bus 140 provides continuity between the data, address and control lines between the terminal and the memory unit. In addition, the terminal 200 provides power to the internal power bus 111 of the memory unit 100. The internal power supply and sensing circuit 2 senses the application of power and applies DC power to the internal circuit elements as well as an initial enabling signal to memory selection circuit 5a. Having thus established the lines of communication, the terminal is then in condition to initiate a security check function. The terminal couples signals on the address and control lines which cause the selection circuit 61 (FIG. 2) to enable the chip enable input 26 of the security memory 50, and to address the upper partition of that memory, where the external identification information is stored. The terminal then reads out such external identification information, which information includes an enciphered external identification number comprising both the enciphered number itself as well as the key by which it can be deciphered. The enciphered external identification information also preferably includes address information for the other partition of the security memory at which the internal identification information is stored. Such information will provide the addresses for four data words which contain the internal identification code assigned to the portable memory device in question. Thus, the information read out from the security memory to the external terminal includes a number of elements, namely (a) an enciphered identification number, (b) a key for deciphering the identification number, and (c) information which is preferably enciphered identifying four locations in the internal portion of the security memory which store the four bytes of the internal identification code.

Having read out that information, the external terminal then switches the upper order address bit to address the lower section of the security memory, i.e., the section where the internal identification information is stored. As will be recalled from the description of FIG. 2, switching the upper order bit also switches the bus structure connected to the security memory such that the data read out of the security memory is no longer imposed on the interface bus, but instead is imposed solely on the internal data bus 152. Having thus addressed the security memory in the section reserved to internal identification information, the terminal then uses the four addresses decoded from the external information to address the four locations in the internal identification storage area which contain the particular security code assigned to the card in question. That information is clocked into the internal information latch 60b where it is held for comparison with external information.

Having thus loaded a first portion of the comparator circuit, the external terminal then drives the address and control lines to gate on the external information section of the comparator circuit 60a, and to load four data words into that latch. The four data words are those which have been decoded utilizing the key, and they are clocked into the comparator latch under the control of address and control signals supplied by the external terminal. Having thus clocked both the external and internal identification information into the comparator circuit 60, a comparison is then made. If the comparator 60 detects a match, it drives its Q output high, triggering the comparator latch 85 (FIG. 3) and providing a final enabling signal for the memory selection circuit 5a. With that gating signal having been generated, the selection circuit 5a is then in a state to respond to address signals applied thereto from the interface bus for selecting individual ones of the memory devices $4a \propto 4n$ which make up the main memory 4 of the portable unit 100. In that way, the external terminal is free to utilize the interface bus 140 for writing new information into the main memory or reading information out of the main memory. As such, a transaction can be completed or information updated, depending on the needs of the application for which the external terminal and memory card are designed.

It is possible and sometimes preferred to utilize a personal identification number (PIN number) in conjunction with the security check. Typically, a terminal under the control of its internal processor will request an identification number, and accept a number (usually 4 digits) input by the user. In the practice of the invention, such PIN number is utilized in performance of the program stored in the main terminal storage section 220 in a relatively conventional fashion. More particularly, the PIN number can be used as a precondition before any further security checks are performed. As a further example, the PIN number can be utilized in the security check function itself. As one example, the PIN number can be utilized in applying the decipher key to the enciphered external identification information, and input of the correct PIN number can be utilized as a modification for the key before application to the enciphered data. In that mode, input of the wrong PIN number will modify the key in such a way that the enciphered information will not be correctly deciphered, resulting in failure to make a comparison by the internal comparator and the resulting lack of access by the external terminal to the main memory.

Figure 5:
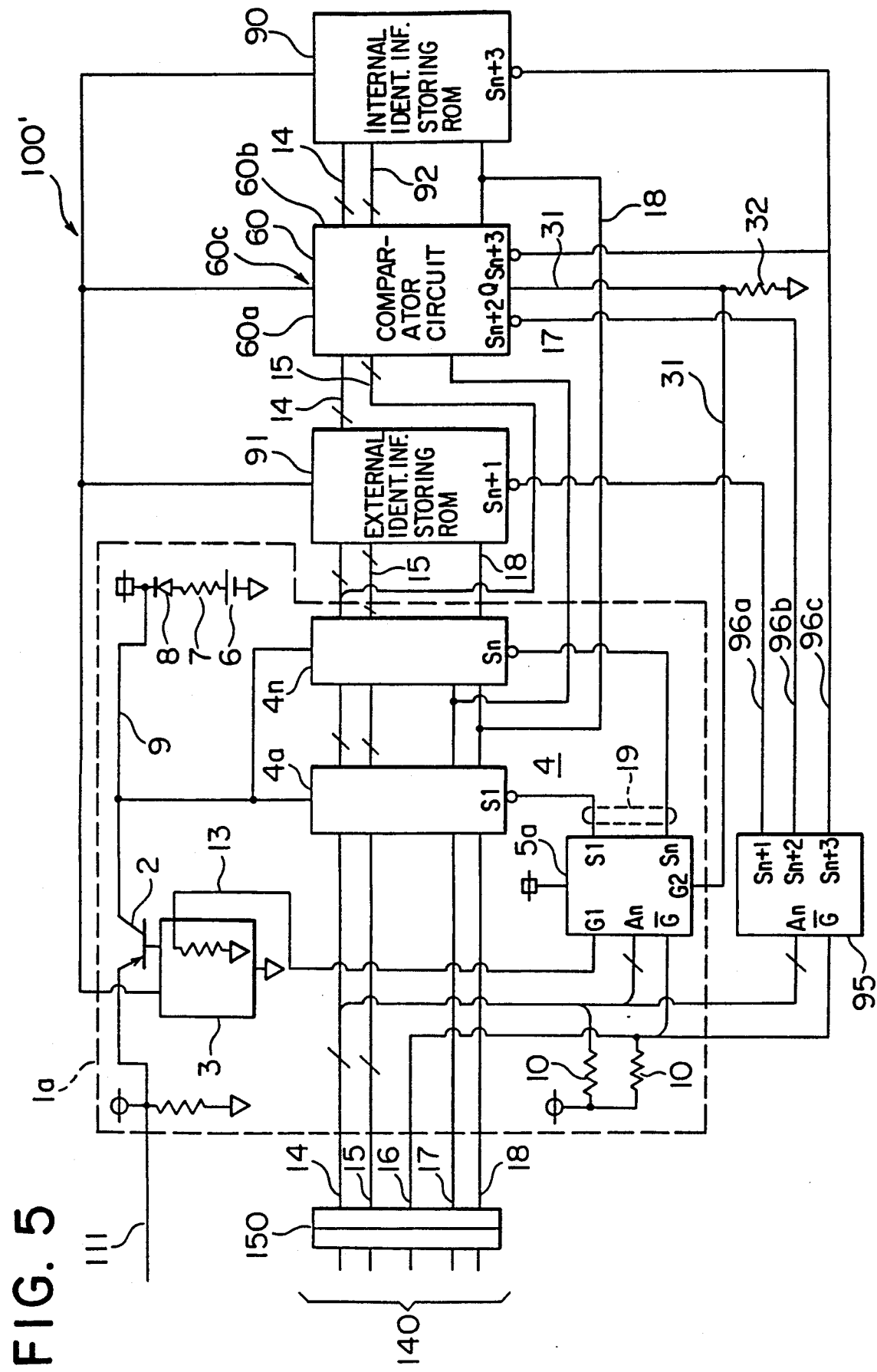
FIG. 5 is a block diagram illustrating a second exemplary portable memory device exemplifying the present invention.

Turning now to FIG. 5, there is shown an alternative configuration for a portable semiconductor device constructed in accordance with the present invention. The elements within the main portion 1a of the memory circuit 100' are substantially the same as those described in connection with FIGS. 1-3. While such elements have been illustrated in FIG. 5, they will not be described in detail since such description would be merely redundant.

The security portions of the system of FIG. 5 function in a manner similar to that of the prior embodiment, but are structured in a somewhat different fashion. In the prior embodiment, the security memory had been configured as a single memory which was segregated by means of memory mapping. In the FIG. 5 embodiment, the security memory segregation is implemented by use of two independent memory devices, a first one of such devices comprising memory device 90 dedicated to storing internal identification information and a second memory device 91 dedicated to storing external identification information. The data buses of such memory elements are maintained quite independent, and thus the need for bus switching structure as in connection with the FIG. 1 embodiment is dispensed with.

In the FIG. 5 embodiment, a data bus 92 emanating from the internal identification information memory 90 is connected to the internal 60. It is seen that the internal data bus 92 is not connected in any way to the data lines 15 of the interface bus, and thus the information stored in the internal memory 90 is maintained within the card and incapable of being read outside of the card. By way of contrast, the external identification information memory 91 has its data lines connected to the main data lines 15 of the interface bus 140, and as a result, the information stored in the external identification ROM 91 (which it is recalled is in enciphered form) is intended for readout to the external terminal by means of the interface bus. Both the internal and external information storage memories 90, 91 have address inputs connected to the address lines 14 of the main interface bus 140 so that operation for readout of information in those respective memories is under the control of the external terminal as described in connection with the previous embodiment.

The comparator circuit 60, like the comparator circuit of FIGS. 2 and 3, has a first section 60a for storing of external identification information, a second section 60b for storing of internal identification information, and an intermediate section 60c for comparing the internal and external information and outputting a positive logic level on an output line 31 whenever a match is detected.

The manner in which the security devices 90, 91 and 60 are enabled is similar to but slightly different than that described in connection with the earlier embodiment. It is seen that a selector element 95 is provided which is addressed and gated by the interface bus 140 just as the corresponding element of FIG. 2. However, the selector of FIG. 5 has three outputs 96a, 96b, 96c which are selectively enabled (driven low) in dependence upon the address applied to the address inputs of that device. When the system first desires to read out the external identification information from the storage device 91, the address lines drive the first output 96a low which provides an enabling signal to the external identification information memory 91. Signals on the address bus 14 then read out the individual words of information from the ROM 91. Such words are read out to the external terminal to provide it with the external identification information which, as in the previous embodiment, preferably includes the external identification number (enciphered), a key for deciphering that information, and a key identifying the storage locations in internal identification information memory 90 at which the internal identifier is stored.

When the external terminal then desires to switch into a further mode for writing the decoded external identification number into the comparator circuit, it drives the second output 96b of the selector circuit 95 low which enables the external information storage circuit 60a of the comparator to receive information. As in the prior embodiment, the data lines and address lines of the interface bus 140 are used by the external terminal to address the respective words in the latch section 60a and read the deciphered identification information into those words for later comparison. Having thus loaded the external information section 60a of the comparator circuit, the external terminal then manipulates the address and control lines of the interface bus to drive the third output 96c of the selector circuit 95 low which serves as a chip enable signal for the internal identification information memory 90. Thus, the memory 90 is enabled for readout, and the external terminal acting through address lines 14 addresses four words in memory 90 for readout to and storage in the internal information latch portion 60b of the comparator circuit 60. It is preferred that such information be at four locations identified in the external information so that the external terminal and internal storage system cooperate in providing further security for the identification code. In any event, however, the four address signals are generated and coupled to the memory 90 for readout of those four words into the latch portion 60b. A comparison is then made which, when a match is detected, generates an enabling signal on line 31 which is coupled to the memory selector circuit 5a as a final enabling signal. As in the prior embodiment, the enabling signal on line 31 remains high, and the circuit 5a then responds to address signals coupled from the address lines 14 of the interface bus to select individual ones of the memory circuit 4a-4n for writing or reading, all under the control of the external terminal.

FIG. 6 further illustrates the related structure of the external and internal systems in performing a security check function. While the structure in terms of circuit elements has been described in detail in connection with prior figures, FIG. 6 further describes the structure of the memory 203 associated with the external terminal. Thus, it will be possible for one skilled in this art based upon this disclosure and the further description of FIG. 6 to configure an appropriate program of instructions for performing the functions in the external terminal needed to affect a system using a portable storage device constructed in acccordance with the present invention.

As shown in FIG. 6, a security check procedure is initiated upon insertion of a portable memory card into an appropriate terminal by performance of step 300. A check is made to determine that the terminal power is on in step 301, and when such power is on, an appropriate supply of power is coupled to the external power supply bus 111 of the portable card. As noted in connection with describing the respective embodiments, that is sensed by internal circuitry on the card to couple power to the standby non-powered circuit elements and also to provide a first enabling signal to the memory selection circuit.

The security check then proceeds to a step 302 where the enciphered external information stored in non-volatile security memory is read into the external terminal. In the origainlly described embodiment, such text is read from the appropriately mapped portion of the single security memory. In the FIG. 5 embodiment, such text is read from the ROM dedicated to such information. In either case, the external terminal then performs a step 303 to decipher the text which it had read from the portable memory device. As a first portion of that operation, the step 303 determines from the deciphered information whether the security check operation is intended to utilize a PIN key-in procedure. If the external terminal determines in the step 303 that a PIN key-in method is required, the method proceeds to a step 304 in which the PIN input is entered by the user. That information is then utilized along with the deciphered text to determine information needed for the remaining security check operation. As a first phase of that operation in the step 304, the system determines from the PIN number and the deciphered information the particular addresses in the internal identification information memory at which the bytes of the assigned security code is stored. Having determined that address information, the external terminal then operates through the address, data and control lines of the interface bus to perform a step 305 which addresses the internal identification information memory (the internal portion of the single memory in FIG. 1 or separate memory in FIG. 5) to read out the bytes of the identification code assigned to the particular card in question. That information is read out onto the internal bus which is maintained internal to the card and is coupled only to the internal latch portion 60b of the comparator circuit. The external terminal controls its address and control lines in such a way as to cause those address bytes to be read out of the security memory and into the internal latch portion 60b in step 305.

Having completed the writing of information into half the comparator, the external terminal then performs a step 306 to decipher from the information previously read out from the external identification information memory the identification code assigned to the card. That information can be deciphered directly using only the key which had been read out with the information, or can additionally utilize the PIN number in such a deciphering operation. In any event, the external terminal then is able to utilize the enciphered information to derive the deciphered identification code for writing into the external portion of the compaarator circuit. It might be thought that such a step would compromise the security of the system, but in fact that is not the case. More particularly, the identification code is deciphered only when the system is utilized in connection with an approved terminal, only with the key which accompanies the enciphered data, and only by a deciphering program which is compatible with the key and the data. Thus, an unauthorized person using an unauthorized terminal to read out the data would be unable to decipher the data. Furthermore, the person would be unable to read out the non-enciphered information because that information is stored in a memory which is inaccessible outside the card. Thus, the security which had been desired is achieved even though the external terminal is capable, in the step of the operation indicated by step 306, to actually decipher outside the terminal the identification code.

Having deciphered the identification code in the step 306, step 307 is then performed to write that deciphered code into the comparator circuit, namely, into the external storage section 60a of the comparator circuit. A step 308 then performs a comparison between the internal and external codes stored in the sections 60a, 60b. A test 309 is performed to determine if those codes match. If they do under a step 310, access to the main memory is allowed. If a match is not detected, the step 311 indicates that access to the main memory is refused.

In some cases, it may be desired to utilize the security check procedure described above but without the necessity to input a PIN number by the user. In that case, security is simply accomplished by information stored in the card cooperating with programs in the terminal for processing such information, and the user himself need not know a PIN number in order to utilize the card. All that is necessary for security in that case is the fact that an authorized card and an authorized terminal are brought together.

That operation is illustrated in the right-hand portion of FIG. 6 which is similar to the left-hand program sequence but simply eliminates the need for PIN key-in and utilization. Thus, a step 304a is performed which is similar to step 304, but accomplishes the deciphering of the storage addresses for the internal memory solely from information in the external identification information read out from the card. Following that deciphering, the program proceeds through steps 305-311 as previously described with the further minor alteration that step 306 does not utilize the PIN number in deciphering the identification code array from the enciphered information. To illustrate that point, the requirement of utilization of the PIN number in step 306 is inserted in brackets to indicate that such information is required only with the higher security aspect of the system requiring use of a PIN number by the user.

It will now be appreciated that what has been provided is a portable information memory card and a system for utilizing such card which provides security without the necessity for an onboard microprocessor. The portable memory card stores two separate items of information utilized in a security check comparison. One item of information need not be enciphered and comprises an identification code assigned to that particular card. That information is protected by virtue of the fact that it is not available to the interface bus under any circumstances, and can thus not easily be read out from the card. The other item of information stored in the portable card is external identification information intended to be read out from the card, processed and then returned to the card for a security comparison. That information is enciphered and carries with it a key which allows a compatible program in an authorized external terminal to decipher the information. The information code is thus deciphered from that information then read back into the card for comparison with internal information provided only internally. In the preferred embodiment, the internal information is obtained from selected words in an internal security memory at addresses determined from the external security information. Thus, the external security information upon being extracted by an external terminal is decoded to determine not only the identification code, but also four secret locations in the internal memory which store the matching code. When those codes are read concurrently into a comparator internal to the portable memory device, detection of a match provides an enabling signal which thereupon allows complete access by the external terminal to the internal main memory which had been protected up until that point. Thus, only a person having access to the appropriate equipment (and usually also to a restricted PIN number) can perform the security check needed to access the internal memory, providing the security which is the object of the present invention.

What is claimed is:

1. A portable semiconductor memory unit for interfacing with and exchanging information with an external terminal, the memory unit having a security function but no microprocessor, and comprising in combination:
   a main memory for storing data for exchange with the external terminal,
   an interface bus for connection between the main memory and the external terminal, the interface bus including data lines, address lines and control lines,
   enabling means for allowing access to the main memory via the interface bus,
   a security memory having:
      a first section for storing enciphered external data, including a key, for coupling to and deciphering in the external terminal utilizing said key,
      a second section for storing internal data which is retained within said unit and inaccessible to the external terminal for performing a security comparison,
   a comparator having:
      a first input for receiving deciphered external data from the external terminal resulting from application of the key to said enciphered external data,
      a second input for receiving said internal data from the second section of the security memory, and
      an output for causing the enabling means to allow access between the external terminal and the main memory upon detection of a match between the internal data and the external data,
   whereby to provide in said unit data to be compared and means for performing the data comparison prior to allowing access between the external terminal and the main memory via the interface bus.

2. The combination as set forth in claim 1 wherein the security memory comprises a single non-volatile memory mapped into upper and lower addressable sections comprising said first and second sections, respectively.

3. The combination as set forth in claim 2 further including a data bus coupled to the security memory, and bus configuration control means having two modes:
   a first mode enabled during addressing of the upper section of the mapped security memory for coupling the data bus to the data lines of the interface bus to allow readout of the enciphered data to the external terminal, and
   a second mode enabled during the addressing of the lower section of the mapped security memory for coupling the data bus directly to the second input of the comparator thereby to prevent readout of the internal data to the external terminal,
   thereby to isolate the internal data in the lower section of the mapped security memory from the interface bus.

4. The combination as set forth in claim 3 further including means responsive to an upper order address bit from said address lines for selectively addressing either the upper or lower section of the mapped security memory, the bus configuration control means also being responsive to said upper order address bit for switching between the first and second modes in such a way as to prevent coupling of the data bus to the interface bus when the lower section of the mapped security memory is addressed.

5. The combination as set forth in claim 2 wherein the enciphered external data stored in the first section of the security memory includes an enciphered external identification code, a key for decoding said enciphered external identification code, and an address identifier for locating an internal identification code in the second section of the security memory.

6. The combination as set forth in claim 5 wherein the enciphered external identification code, when decoded by use of said key, comprises said external data, and the internal identification code, when read out from the second section of the security memory, comprises said internal data, for comparison by said comparator.

7. The combination as set forth in claim 5 further including comparator control means having two modes:
   a first mode for receiving the deciphered external data from the data lines of the interface bus under the control of address and control lines of the interface bus, said deciphered external data including an external identification code derived from the enciphered external identification code deciphered by means of said key, and
   a second mode for receiving data from the second section of the security memory under the control of address and control lines of the interface bus at addresses specified by the address identifier derived from the enciphered external data.

8. The combination as set forth in claim 1 wherein the external terminal further includes means for receiving a PIN user identification number, and means for applying said PIN number with said key in deciphering the enciphered external data.

9. The combination as set forth in claim 7 wherein the external terminal further includes means for receiving a PIN user identification number, and means for applying said PIN number with said key in deciphering the enciphered external data.

10. The combination as set forth in claim 1 wherein the security memory comprises first and second non-volatile memory elements,
    a first one of said non-volatile memory elements serving as said first section of the security memory, the first non-volatile memory element being coupled to the data lines, address lines and control lines of the interface bus for allowing the external terminal access to the enciphered data stored therein,
    a second one of said non-volatile memory elements serving as the second section of the security memory, the second non-volatile memory element being coupled to the address lines of the interface bus, but having data lines connected internally to the second input of the comparator, whereby identification information stored in the second non-volatile memory element is unavailable to the interface bus.

11. The combination as set forth in claim 10 including memory selection means having two modes:
    a first mode for enabling the first non-volatile memory element for readout of enciphered data to the external terminal via the interface bus, and
    a second mode for enabling the second non-volatile memory element for readout of data to the second input of the comparator while maintaining said data isolated from the interface bus.

12. The combination as set forth in claim 11 wherein the first non-volatile memory element stores an enciphered external identification code, a key for deciphering said enciphered external identification code, and an address identifier for locating an internal identifier code in the second non-volatile memory element.

13. The combination as set forth in claim 12 wherein the enciphered external identification code, when deciphered by use of said key, comprises said external data, and the internal identification code, when read out from the second non-volatile memory element, comprises said internal data, for comparison by said comparator.

14. The combination as set forth in claim 12 further including comparator control means having two modes:
   a first mode for receiving the deciphered external data from the data lines of the interface bus under the control of address and control lines of the interface bus, said deciphered external data including an external identification code derived from the enciphered external identification code deciphered by means of said key, and
   a second mode for receiving data from the second non-volatile storage element under the control of address and control lines of the interface bus at addresses specified by the address identifier from the enciphered external data.

15. A secure memory system including an external terminal and a portable memory unit for interfacing and exchanging information with the external terminal, the portable memory unit having no microprocessor, the system comprising the combination of:
   a main memory in the unit for storing data for exchange with the external terminal;
   an interface bus connecting the unit with the external terminal for exchanging information between the terminal and the main memory, the interface bus including data lines, address lines and control lines,
   enabling means in the unit for allowing access to the main memory via the interface bus,
   a security memory in the unit having:
      a first section for storing enciphered external data, including a key,
      a second section for storing internal data which is retained within said unit and inaccessible to the external terminal,
   the external terminal including means for receiving the enciphered external data from the first section of the security memory via the interface bus, deciphering the enciphered data and returning deciphered external data to the unit,
   a comparator in the unit having:
      a first input for receiving an external identification code derived from the deciphered external data,
      a second input for receiving an internal identification code derived from the internal data in the second section of the security memory, and
      an output for causing the enabling means to allow access between the external terminal and the main memory upon detection of a match between the internal and external identification codes.

16. The combination as set forth in claim 15 wherein the deciphered external data includes the external identification code to be compared with the internal identification code read out from the second section of the security memory, and an address identifier for locating the internal identification code in the second section of the security memory.

17. The combination as set forth in claim 15 wherein the security memory comprises a single non-volatile memory mapped into upper and lower addressable sections comprising said first and second sections, respectively.

18. The combination as set forth in claim 17 further including a data bus coupled to the security memory, and bus configuration control means having two modes:
   a first mode enabled during addressing of the upper section of the mapped security memory for coupling the data bus to the data lines of the interface bus to allow read out of the enciphered data to the external terminal, and
   a second mode enabled during addressing of the lower section of the mapped security memory for coupling the data bus directly to the second input of the comparator thereby to prevent read out of the internal data to the external terminal,
thereby to isolate the internal data in the lower section of the mapped security memory from the interface bus.

19. The combination as set forth in claim 18 further including means responsive to an upper order address bit from said address lines for selectively addressing either the upper or lower section of the mapped security memory, the bus configuration control means also being responsive to said upper order address bit for switching between the first and second modes in such a way as to prevent coupling of the data bus to the interface bus when the lower section of the mapped security memory is addressed.

20. The combination as set forth in claim 16 further including comparator control means having two
   a first mode for receiving the deciphered external data from the data lines of the interface bus under the control of address and control lines of the interface bus, said deciphered external data including an external identification code derived from the enciphered external identification code deciphered by means of said key, and
   a second mode for receiving data from the second section of the security memory under the control of address and control lines of the interface bus at addresses specified by the address identifier derived from the enciphered external data.

21. The combination as set forth in claim 15 wherein the security memory comprises first and second non-volatile memory elements,
   a first one of said non-volatile memory elements serving as said first section of the security memory, the first non-volatile memory element being coupled to the data lines, address lines and control lines of the interface bus for allowing the external terminal access to the enciphered data stored therein,
   a second one of said non-volatile memory elements serving as the second section of the security memory, the second non-volatile memory element being coupled to the address and control lines of the interface bus, but having data lines connected internally to the second input of the comparator, whereby identification information stored in the second non-volatile memory element is unavailable to the interface bus.

22. The combination as set forth in claim 21 including memory selection means having two modes:

a first mode for enabling the first non-volatile memory element for readout of enciphered data to the external terminal via the interface bus, and a second mode for enabling the second non-volatile memory element for readout of data to the second input of the comparator while maintaining said data isolated from the interface bus.

23. The combination as set forth in claim 22 wherein the first non-volatile memory element stores an enciphered external identification code, a key for deciphering said enciphered external identification code, and an address identifier for locating an internal identifier code in the second non-volatile memory element.

24. The combination as set forth in claim 23 further including comparator control means having two modes:
   a first mode for receiving the deciphered external data from the data lines of the interface bus under the control of address and control lines of the interface bus, said deciphered external data including an external identification code derived from the enciphered external identification code deciphered by means of said key, and
   a second mode for receiving data from the second non-volatile memory element under the control of address and control lines of the interface bus at addresses specified by the address identifier from the enciphered external data.

25. A method of exchanging data between an external terminal and a portable semiconductor memory unit while maintaining the security of the data stored in the portable semiconductor memory unit, the method being performed without a microprocessor in the portable semiconductor memory unit, the method comprising the steps of:
   providing a main memory and an interface bus in the semiconductor memory unit for connection to the external terminal for exchanging information therewith,
   controlling the enabling of the main memory in the unit to allow the external terminal access via the interface bus to the main memory only after the performance of a security clearance procedure,
   and performing the following security clearance procedure prior to enabling the external terminal access to the main memory:
      reading enciphered external data from a security memory onto the interface bus under the control of address and control information supplied by the external terminal,
      deciphering the enciphered external data in the external terminal and returning to the unit deciphered external data, the deciphered external data including an external identification code for comparison with an internal identification code,
      reading the internal data from the security memory at predetermined address locations to read out for comparison an internal identification code,
      comparing in the unit the external identification code and the internal identification code and, upon detection of a match, enabling access to the main memory by the external terminal,
   and preventing access by the external terminal to the address locations at which the internal data is stored in the security memory.

26. The method as set forth in claim 25 wherein the step of reading internal data from the security memory includes reading out the internal data at predetermined addresses specified in the deciphered external data.

27. The method as set out in claim 26 wherein the security memory comprises a single non-volatile memory mapped into upper and lower addressable sections, and wherein the step of reading enciphered external data comprises reading said data from the upper section of the security memory, and the step of reading internal data comprises reading out said internal data from the lower section of the security memory.

28. The method as set forth in claim 27 wherein the security memory has a data bus, and further including the step of operating a bus configuration control in two modes including:
   a first mode in which the upper section of the mapped security memory is configured for coupling the data bus to data lines of the interface bus to allow readout of the enciphered data to the external terminal, and
   a second mode in which the lower section of the mapped security memory is addressed to read out in isolation from the interface bus the internal identification code for comparison with the deciphered external identification code.

29. The method as set forth in claim 28 in which the bus configuration control is operated in conjunction with the addressing of the mapped upper and lower sections of the security memory such that the reading enciphered external data step includes enabling the upper section of the security memory while coupling the data bus to the interface bus, and the reading internal data step includes enabling the lower section of the mapped security memory while isolating the data bus from the interface bus.

30. The method as set forth in claim 27 in which the step of comparing comprises the steps of:
   receiving the deciphered external identification code from data lines of the interface bus under the control of address and control lines of the interface bus, and
   receiving data from the lower section of the security memory under the control of address and control lines of the interface bus at addresses specified in the deciphered external data.

31. The method as set forth in claim 26 wherein the security memory comprises first and second non-volatile memory elements, and said method further comprising the steps of:
   coupling a first one of the non-volatile memory elements to data lines, address lines and control lines of the interface bus for allowing the external terminal access to the enciphered data stored therein, and
   coupling the second non-volatile memory element to the address and control lines of the interface bus, but isolating the data lines of the second non-volatile memory from the interface bus for internal use in the memory unit in the comparison step, whereby identification information stored in the second non-volatile memory element is unavailable to the interface bus.

32. The method as set forth in claim 31 further including the steps of controlling memory selection between two non-volatile memory sections including the steps of:
   enabling the first non-volatile memory element for readout of enciphered data to the external terminal via the interface bus, and
   alternatively and exclusively of the first enabling step, enabling the second non-volatile memory element for readout of data internally for purposes of said comparison step.

33. The method as set forth in claim 32 wherein the comparison step further includes, functioning in a first mode for receiving the deciphered external identification code from the data lines of the interface bus under the control of address and control lines of the interface bus, functioning in a second mode for reading out data from the second non-volatile memory element under the control of address and control lines of the interface bus at addresses specified in the deciphered external data.

* * * * *